United States Patent
Adling et al.

(10) Patent No.: US 8,711,808 B2
(45) Date of Patent: Apr. 29, 2014

(54) METHOD FOR SWITCHING CHANNELS IN A WIRELESS COMMUNICATION NETWORK

(75) Inventors: Anja Adling, Nürnberg (DE); Wolfgang Bölderl-Ermel, Wendelstein (DE); Stefan Keller, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 252 days.

(21) Appl. No.: 13/212,880

(22) Filed: Aug. 18, 2011

(65) Prior Publication Data

US 2012/0044888 A1 Feb. 23, 2012

(30) Foreign Application Priority Data

Aug. 18, 2010 (EP) ..................................... 10008619

(51) Int. Cl.
*H04W 4/00* (2009.01)
(52) U.S. Cl.
USPC ........... 370/331; 370/338; 370/401; 370/445; 370/462; 370/463
(58) Field of Classification Search
USPC .......... 370/400, 401, 445, 447, 461, 462, 463
See application file for complete search history.

(56) References Cited

U.S. PATENT DOCUMENTS

2010/0103850 A1 4/2010 Gossain et al.

FOREIGN PATENT DOCUMENTS

| EP | 1 944 996 | 7/2008 |
| EP | 2 205 016 | 7/2010 |
| WO | WO 2010/027308 | 3/2010 |

*Primary Examiner* — Alvin Zhu
(74) *Attorney, Agent, or Firm* — Cozen O'Connor

(57) ABSTRACT

A method for switching channels in a wireless communication network comprising at least one access point and clients, wherein the communication network as secondary user uses one of a number of possible channels for data communication. In accordance with the invention, data communication occurs between the access point and the number of clients through the first transmit/receive interface of the access point on a first channel. Parallel to the data communication, a check of the possible channels occurs over the transmit/receive interface by a second transmit/receive interface of the access point to determine which of the channels are free channels that are not being used by any primary users. A channel switch from the first channel to one of the free channels occurs if a prioritized use of the first channel by a primary user is established by the access point of the communication network.

14 Claims, 2 Drawing Sheets

METHOD FOR SWITCHING CHANNELS IN A WIRELESS COMMUNICATION NETWORK

BACKGROUND OF THE INVENTION

1. Field of the Invention

The invention relates to network communications and, more particularly, to a method for switching channels in a wireless communication network comprising at least one access point and a number of clients, where the communication network uses one of a plurality of channels as a secondary user for data communication in a predetermined frequency range. The invention also relates to an access point of a wireless communication network.

2. Description of the Related Art

The Industrial, Scientific and Medical (ISM) frequency band extends across the frequency range from 5.15 GHz to 5.725 GHz, is largely free of license payments and is globally available. For this reason, the ISM frequency band is used by users not only for wireless communication networks based, for example, on the WLAN (Wireless Local Area Network) standard or on Bluetooth, but also by radar systems at airports or on ships. As a result, there are rules to facilitate cooperative use of the ISM frequency band, because of such possible multiple uses in this frequency band.

The regulatory authorities have divided the users (i.e., the wireless communication networks and also radar applications) into primary and secondary users, which is equivalent to a prioritization. In Germany and many European countries, this subdivision applies particularly to the 5.25 GHz to 5.35 gigahertz (i.e., channel 52 to 64) and 5.47 to 5.725 GHz (i.e., channel 100 to 140) bands. In accordance with certain rules, a wireless local network (WLAN) forming a secondary user must withdraw into an outer band as soon as a radar application is detected by the user, because the application is basically a primary user. As a result, there is a necessity of the WLAN to search the channel used by the communication network for primary users. On detection of a primary user, the channel must be released by the WLAN and a switch must be made to another channel that is unused by a primary or secondary user. This capability is referred to as Dynamic Frequency Selection (DFS).

Here, the access point of the WLAN must periodically listen to the channel used by it to detect the primary user. This is referred to as a Channel Availability Check (CAC). As soon as a foreign sender is detected, the access point blocks this channel for use by its communication network for a specific time and initiates the channel switch to a free channel. In such cases, the new channel is selected at random and the selection is generally performed by the access point. A check must initially be performed on this new channel for a predetermined period of time, as a rule 60 seconds, to determine whether a primary user is present. This check is referred to as a Channel Observation Time (COT). If no foreign user is found, a channel switch to this free channel occurs. The switch is also performed by the clients of the wireless communication network. If another system is detected during the COT, the WLAN access point also blocks this channel for a specific time and checks the next channel for the predetermined time to detect the presence of other systems.

The interruption of data communication of the wireless communication network is not only a consequence of a forced channel switch, but also frequently occurs after 24 hours to perform an exhaustive check of all radio channels. Consequently, data communication in the wireless communication network is interrupted at least once a day. Some systems perform this check during operation, where an exhaustive check of the channels is only performed in the event of suspicion of other systems.

A problem associated with a channel switch is the handover time of a respective WLAN client once the access point has detected a primary user. As a rule, the channel switch is linked to a communication outage ranging in time over a number of beacon intervals, which is the result of the initiated search for a free channel. Even if the access point already knows about a free channel, the communication outage lasting for a number of beacon intervals is the eventual result. Typically, a beacon interval amounts to between 20 and 1000 ms. The reason for the communication outage is because although the access point transmits information in a beacon (i.e., a Channel Switch Announce (CSA)) immediately after a primary user has been detected, with which the clients are informed about the channel on which further communication is to occur, the access point itself does not however perform this channel switch immediately. This is because, the access point remains for a further number of beacon intervals on the old channel to ensure that all clients of the wireless communication network are actually switching channels and to send out the CSA element. Here, the clients are only allowed to re-communicate when they receive a beacon from the access point in which there is no CSA element on the new free channel.

It is basically of importance, especially in industrial use of a wireless communication network, for a defined quality of the communication network to be provided for data throughput and real-time capabilities. This quality is only provided, however, if the behavior of all points (i.e., access points and clients) of the communication network is able to be planned and predicted. Only in this way are reliable radio connections able to be realized.

SUMMARY OF THE INVENTION

It is therefore an object of the present invention to provide a method with which channel switching in a wireless communication network can be performed in an improved manner. A further object of the invention is to provide an access point of a wireless communication network by which it is possible to switch channels efficiently in a wireless communication network.

These and other objects and advantages are achieved in accordance with the invention by providing an access point and method for channel switching in a wireless communication network comprising at least one access point and a number of clients that uses one of a plurality of possible channels as a secondary user for data communication in a predetermined frequency range. In accordance with the method of the invention, data communication occurs between the access point in the plurality of clients over a first transmit/receive interface of the access point on a first channel of the possible channels. In parallel to the data communication over the first transmit/receive interface, the plurality of possible channels are checked over a second transmit/receive interface of the access point to determine which of the channels are free channels which are not being used by any primary users. Finally, a channel switch from the first channel to one of the free channels is performed if a prioritized use of the first channel by a primary user is established by the access point.

The transmit/receive interfaces of the access points are also referred to as radio adapters. If this description refers to checking the possible channels, this can be taken to mean all channels of the predetermined frequency range but also only a predefined subset of all channels of the predetermined frequency range.

In an embodiment, a free channel is especially present if a channel is being used by neither a primary user nor by a secondary user. Here, a primary user can typically be a transmitter or transceiver unit or a corresponding wireless network which, as a result of the regulatory authority for wireless communication, is classified as a primary user. Furthermore, a secondary user can typically be a transmitter or transceiver unit or a corresponding wireless network which, as a result of a regulatory authority for wireless communication, is characterized as a secondary user.

Various advantages are produced by using an additionally available transmit/receive interface solely for scanning the frequency range for other users, especially primary users. On the one hand, a communication interruption every 24 hours on the operatively used transmit/receive interface can be avoided. On the other hand, the switchover from the first channel to a free channel can occur more quickly, since at the time of the detection of a primary user on the first channel it is already known which channel of the predetermined frequency range can be used for further communication. This enables interruption of data communication to be significantly reduced.

In order to ensure that the information about a free channel is actually available on detection of a primary user on the used first channel of the wireless communication network that is utilized, checking of the possible channels for free channels is performed continuously via the second transmit/receive interface.

When there is a channel switch, the free channel on which further communication is to be continued on detection of the primary user on the first channel is notified of the number of clients in a beacon of the free channel to be used. Here, it is expedient for the beacon to be transmitted to the clients immediately after detection of the use of the first channel by a primary user. In particular, there is provision in this context for the information about the free channel to be used to be integrated into a beacon signaling the channel switch.

Data communication on the free channel to be used can, on the one hand, be performed over the first transmit/receive interface. It is an alternative and preferable, because of a further reduced switchover time after the detection of a primary user, for data communication on the free channel to be used to be performed over the second transmit/receive interface. This enables the communication interruption described at the outset for a specific time on the operatively used first transmit/receive interface after detection of a primary user to be comprehensively reduced.

In the presently contemplated alternate embodiment, the clients are notified of a hardware address (i.e., Media Access Control (MAC) address) of the second transmit/receive interface in the beacon, in which the free channel to be used is signaled.

Expediently, after the channel switch has been performed by the first transmit/receive interface of the access point, in parallel to the data communication over the second transmit receive interface, all of the plurality of possible channels are checked to determine which of the plurality of possible channels are free channels. In other words, after the second transmit/receive interface assumes operative communication, the first transmit/receive interface now scans the free channels and thereby a rolling exchange of interfaces has occurred.

The contemplated embodiments of the method are especially applied in a frequency range in the ISM frequency band between 5.15 GHz and 5.75 GHz, since this is frequently used in parallel because of its availability and largely license-free nature by wireless communication networks and also by radar applications. Broadly speaking, however, the method in accordance with the disclosed contemplated embodiment can also be employed in other frequency bands.

Preferably, the communication network as the secondary user of the predetermined frequency range comprises a WLAN or Bluetooth-based communication network.

A user is a primary user of the predetermined frequency range especially if a radar signal has been detected by the access point of the wireless communication network.

The invention also provides an access point for a wireless communication network that is especially based on WLAN or Bluetooth. In accordance with the invention, the access point is configured to perform data communication between the access point and a plurality of clients of the communication network over a first transmit/receive interface of the access point on a first channel of a plurality of possible channels. The access point is also configured to check, in parallel to the data communication over the first transmit/receive interface, a second transmit/receive interface for the plurality of the possible channels as to which channels are free channels not being used by any primary user, and to initiate a channel switch from the first channel to one of the free channels if a prioritized use of the first channel by a primary user is established by the access point of the communication network.

The same advantages are associated with the disclosed access point as have been explained here in conjunction with the disclosed embodiments of the method of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be now described in more detail with reference to preferred embodiments shown by way of non-limiting example in the attached drawings, in which.

DETAILED DESCRIPTION OF THE PRESENTLY EMBODIMENTS

Figure 1:
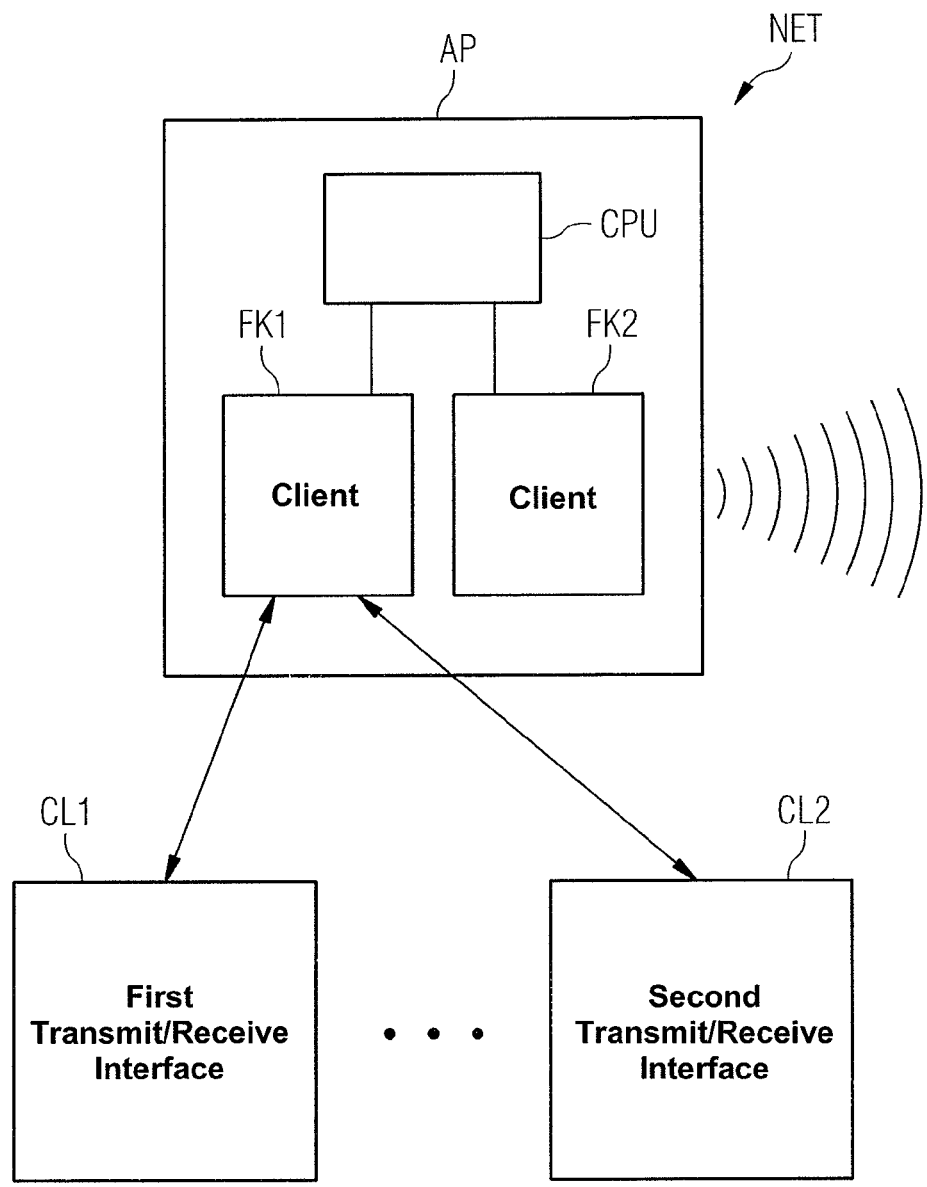
FIG. 1 is an exemplary schematic block diagram of a wireless communication network comprising a wireless local area network (WLAN) in which the method for switching channels in accordance with an embodiment of the invention is implemented.

FIG. 1 is an exemplary schematic block diagram of a wireless communication network. Typically, a wireless communication network comprises an access point AP and two clients CL1, CL2. Regardless of how it is shown in the FIG. 1, the wireless communication network could also have a plurality of access points AP and a larger or smaller number of clients.

The access point AP has a central processing unit CPU which is coupled to a first and second transmit/receive interfaces FK1, FK2. In addition, the access point AP can include further components (not shown) which are necessary for implementation of the invention. The transmit/receive interfaces FK1, FK2 are also referred to as radio adapters or radio cards.

Data communication between the access point AP and a respective client CL1, CL2 is performed within a predetermined frequency range, e.g., in the Industrial, Scientific and Medical (ISM) frequency range between 5.15 GHz and 5.75 GHz. Within this frequency range, data communication is performed on one or more channels, e.g., channel 54, and the access point AP and the clients CL1, CL2 communicate on this channel by the first transmit/receive interface FK1. The WLAN-based communication network NET is merely the secondary user of the currently operatively-used channel. As a result, the channel must be monitored for a prioritized primary user, e.g., a radar application. This monitoring (i.e., the detection of a radar application) is performed by the first transmit/receive interface FK1.

With the second transmit/receive interface FK2, in parallel to actual operation and preferably continuously, the free channels within the predetermined frequency range are searched. Here, a free channel is to be understood as those channels that are unused under any circumstances by a primary user and optionally also not by another secondary user.

Both the first and the second transmit/receive interface FK1, FK2 notify the central processing unit CPU of radar applications and free channels that are found. In the event of detection of a radar application by the first transmit/receive interface FK1, the permanent scanning for free channels by the second transmit/receive interface FK2 means that a free channel is immediately available for switching to continue the data communication. The central processing unit CPU can then implement a channel switch without interrupting communication, for example, by transferring operative data communication to the second transmit/receive interface FK2 while scanning of the free channels is assumed by the first transmit/receive interface FK1.

Switching over the operative data communication to the transmit/receive interface initially used for scanning after detection of a primary user over the operative transmit/receive interface and the use of a channel detected as free from radar use make a smooth operation of a wireless communication network possible, which is especially of importance in the industrial environment. The transfer of the MAC address of the second transmit/receive interface FK2 during a channel switch and continuation of the communication over this second transmit/receive interface FK2 is assumed by a information element in a beacon sent from the access point to the clients, with which the clients are informed about the switch of channel. The corresponding beacon can be transmitted over the first transmit/receive interface FK1 a number of times, while data communication is already occurring simultaneously over the second transmit/receive interface FK2. After the transmission of the beacons which signal the channel switch is finished, the first transmit/receive interface FK1 switches to the described scan operation to search for free channels in the predetermined frequency range.

The method of operation in accordance with the invention, enables the interruption of communication after 24 hours to check for radar applications to be avoided. Likewise, checking for radar applications can be reduced to a minimal outlay. This is because even such a check causes a short, but in an industrial application, unacceptable outage of data communication. An additional gain is that in the event of radar detection on the user data channel, i.e., the channel used by the first transmit/receive interface FK1, no (i.e., 60 second-long) checking is necessary because a free channel switch has already been discovered over the second transmit/receive interface FK2.

A further advantage is that, by using the second transmit/receive interface, the above-described communication outage of the number of beacon intervals in the event of the first transmit/receive interface FK1 detecting radar communications can be bypassed. Generally, the access point AP is immediately ready after detection of radar communications to re-resume operative communication on the free switched channel.

The second transmit/receive interface FK2 has another hardware address, i.e., a MAC address from the first transmit/receive interface FK1. As result, the clients CL1, CL2 are also notified in the beacons in which these are informed by an inserted information element about the changed hardware address. The switchover of communication during a channel switch from the first transmit/receive interface FK1 to the second transmit/receive interface FK2 enables shortening of the switchover time after the detection of a primary user from the previous several hundred milliseconds to a few milliseconds.

It is thus merely necessary to ensure that the clients of the wireless communication network NET can interpret the corresponding information (in a so-called info. element) within the beacon with the MAC address of the second transmit receive interface FK2 to ensure that this switchover proceeds smoothly.

By using a second transmit/receive interface FK2 in an access point AP to scan for free channels communication interruptions, which occurs every 24 hours on the operatively-used transmit/receive interface, are avoided. Scanning for free channels is to be equated with receiving signals from primary users (as a rule radar signals) in the frequency range that is utilized. The free channels can be determined from this information. Likewise, an interruption in communication after detection of a primary user can be avoided because the free channel to be used is known to the central processing unit CPU of the access point AP.

Figure 2:
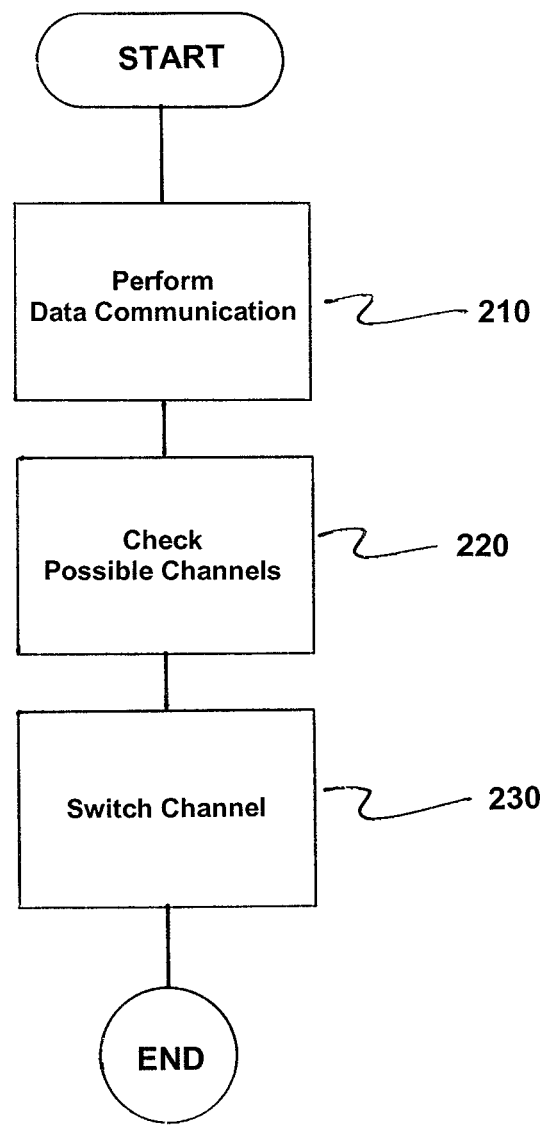
FIG. 2 is a flowchart of the method in accordance with an embodiment of the invention.

FIG. 2 is a flow chart of a method for switching channels in a wireless communication network NET comprising at least one access point AP and a plurality clients CL1, CL2, where the communication network NET utilizes one of a plurality of possible channels as a secondary user for data communication in a predetermined frequency range. The method comprises performing data communication between the at least one access point AP and the plurality of clients CL1, CL2 over a first transmit/receive interface FK1 of the at least one access point AP on a first channel of the plurality of possible channels, as indicated in step 210.

A second transmit/receive interface FK2 of the at least one access point AP checks, in parallel to the data communication and over the first transmit/receive interface FK1, the plurality of possible channels to determine which of the plurality of channels are free channels not used by any primary user, as indicated in step 220.

A channel switch from the first channel of the plurality of possible channels to one of the free channels is performed if a prioritized use of the first channel by a primary user is established by the at least one access point AP of the communication network NET, as indicated in step 230.

Thus, while there are shown, described and pointed out fundamental novel features of the invention as applied to preferred embodiments thereof, it will be understood that various omissions and substitutions and changes in the form and details of the illustrated method and apparatus, and in their operation, may be made by those skilled in the art without departing from the spirit of the invention. Moreover, it should be recognized that methods and structures shown and/or described in connection with any disclosed form or embodiment of the invention may be incorporated in any other disclosed or described or suggested form or embodiment as a general matter of design choice.

What is claimed is:

1. A method for switching channels in a wireless communication network comprising at least one access point and a plurality clients, wherein the communication network utilizes one of a plurality of possible channels as a secondary user for data communication in a predetermined frequency range, the method comprising:
   performing data communication between the at least one access point and the plurality of clients over a first transmit/receive interface of the at least one access point on a first channel of the plurality of possible channels;
   checking, a second transmit/receive interface of the at least one access point, in parallel to the data communication via the first transmit/receive interface, a second transmit/receive interface of the at least one access point checking the plurality of possible channels to determine which of the plurality of channels are free channels which are unused by any primary users;
   performing a channel switch from the first channel of the plurality of possible channels to one of the free channels if a prioritized use of the first channel by a primary user is established by the at least one access point of the communication network, the channel switch being performed such that operative data communication is transferred to the second transmit/receive interface while scanning of the free channels is assumed by the first transmit/receive interface.

2. The method as claimed in claim 1, wherein the checking of the plurality of possible channels to determine which of the plurality of possible channels are free channels is performed continuously over the second transmit/receive interface.

3. The method as claimed in claim 1, wherein each of the plurality of clients is notified in a beacon about a free channel to be used for the channel switch.

4. The method as claimed in claim 2, wherein each of the plurality of clients is notified in a beacon about a free channel to be used for the channel switch.

5. The method as claimed in claim 1, wherein data communication on a free channel to be used is performed over the first transmit/receive interface.

6. The method as claimed in claim 1, wherein data communication on a free channel to be used is performed over the second transmit/receive interface.

7. The method as claimed in claim 6, wherein each of the plurality of clients is notified of a hardware address of the second transmit/receive interface in a beacon in which a free channel to be used is signaled.

8. The method as claimed in claim 6, further comprising:
   checking, in parallel to the data communication, all of the plurality of possible channels over the second transmit/receive interface to determine which of the plurality of possible channels are free channels after a channel has been switched by the first transmit/receive interface of the access point.

9. The method as claimed in claim 5, further comprising:
   checking, in parallel to the data communication, all of the plurality of possible channels over the second transmit/receive interface to determine which of the plurality of possible channels are free channels after a channel has been switched by the first transmit/receive interface of the access point.

10. The method as claimed in claim 1, wherein the predetermined frequency range lies in the Industrial, Scientific and Medical (ISM) frequency range between 5.15 GHz and 5.725 GHz.

11. The method as claimed in claim 1, wherein the communication network as the secondary user of the predetermined frequency range comprises a local area network (LAN) or Bluetooth-based communication network.

12. The method as claimed in claim 1, wherein the primary user of the predetermined frequency range emerges if a radar signal was detected by the at least one access point.

13. An access point for a wireless communication network, wherein the access point is configured to:
   perform data communication between the access point and a plurality of clients of the wireless communication network over a first transmit/receive interface of the access point on a first channel of a plurality of possible channels;
   check, in parallel to the data communication over the first transmit/receive interface by a second transmit/receive interface, each of the plurality of possible channels to determine which of the plurality of possible channels are free channels which are unused by any primary users;
   initiate a channel switch from the first channel of the plurality of possible channels to one of the free channels if the access point of the communication network establishes a prioritized use of the first channel by a primary user, the channel switch being performed such that operative data communication is transferred to the second transmit/receive interface while scanning of the free channels is assumed by the first transmit/receive interface.

14. The access point as claimed in claim 13, wherein the communication network comprises one of a wireless local access network (LAN) and Bluetooth-based communication network.

* * * * *